INVENTOR.
ARTHUR J. NELSON

INVENTOR.
ARTHUR J. NELSON
BY Naylor & Neal
ATTORNEYS

Nov. 22, 1966    A. J. NELSON    3,286,286
PONTOON SUPPORT FOR OVER-THE-WATER PIPELINES
Filed Nov. 18, 1964    5 Sheets-Sheet 5

INVENTOR.
ARTHUR J. NELSON
BY Naylor & Neal
ATTORNEYS

United States Patent Office 3,286,286
Patented Nov. 22, 1966

3,286,286
PONTOON SUPPORT FOR OVER-THE-WATER
PIPELINES
Arthur J. Nelson, 611 Las Palmas Drive,
Santa Barbara, Calif.
Filed Nov. 18, 1964, Ser. No. 412,003
17 Claims. (Cl. 9—1)

The present invention relates to an assembly for supporting universally connected sections of pipeline above the surface of a body of water, and is particularly directed to an arrangment for suporting the sections of limited articulated movement relative to each other while maintaining a degree of flexibility which minimizes torsional stresses in the pipeline and enhances stability.

In the prior art, various pontoon arrangements have been provided to support pipelines above the surface of a body of water. These arrangements were typically employed for running pipelines to offshore installations, such as wells and dredging devices. In some instances the pipelines of these arrangements were supported above the surface of the body of water in which they were being used both during their initial positioning and subsequent use for conveying fluids, whereas in other instances these pipelines were initially positioned above the surface of the body of water and subsequently submerged for use. However, regardless of the manner in which these arrangments were used, they have always presented severe problems when subjected to the wave and wind action of rough seas. These problems resulted primarily because: the arrangements did not have controlled flexibility adapted to conform with rough sea conditions while at the same time maintaining a controlled stability; the arrangments presented structures subject to the brunt of both wave and wind action; and, the arrangments transmitted movement to the pipeline supported thereby as torsional stresses.

It is, accordingly, a principal object of the invention to provide a system for supporting pipelines above the surface of a body of water which avoids prior art problems of the type enumerated above.

A more specific object of this invention is to provide an over-the-water pipeline supporting system which pendulously suspends the pipeline from independent framework structures having controlled buoyancy.

Yet another specific object of this invention is to provide such a system wherein the frameworks cn freely tilt and roll with wave action and even become partly awash.

Still another object of this invention is to provide a system wherein buoyancy of the frameworks is accommodated through use of pontoons having controlled floatation characteristics; which characteristics may be varied either responsive to the load supported by the pontoons to maintain constant displacement, or selectively to accommodate different sea conditions.

Another object of the invention related to the latter object is to provide a buoyant arrangement for supporting pipelines above the surface of a body of water, which arrangement is maintained at a constant displacement with varying densities of material passing through the pipe.

Another object of the invention is to provide an improved ball joint construction for articulatively joining sections of pipeline.

The basic system of the invention may be broadly defined as an assembly for supporting sections of pipeline having universally connected ends above the surface of a body of water for limited articulative movement relative to each other about these ends. The basic assembly comprises a plurality of aligned frameworks disposed in parallel relationship to each of the sections, which frameworks are provided with upstanding portions suspending the section of pipeline in parallel relationship therewith and base portions having pontoons secured thereto adapted to assume a position floating on a body of water in which the assembly is being used. The pontoons on each of the frameworks are disposed on opposite sides of the pipeline section supported thereby and are of sufficient buoyancy to support both the framework and the section suspended therefrom. When in aligned relationship, the pontoons on adjacent frameworks are disposed along lines extending substantially parallel to the pipeline and the frameworks disposed adjacent the universally connected ends of the pipeline sections are joined together for limited articulated movement with respect to each other.

The foregoing and other objects and the basic assembly and the details of the structure cooperating therewith will become more apparent when viewed in light of the accompanying drawings, wherein:

FIG. 4 is a detailed elevational view of the section of the pontoon support illustrated in FIG. 3;

FIG. 3 is a sectional view taken on plane 5-5 of FIG. 4;

FIG. 7 is a sectional view taken on plane 7—7 of FIG. 6;

Figure 1:
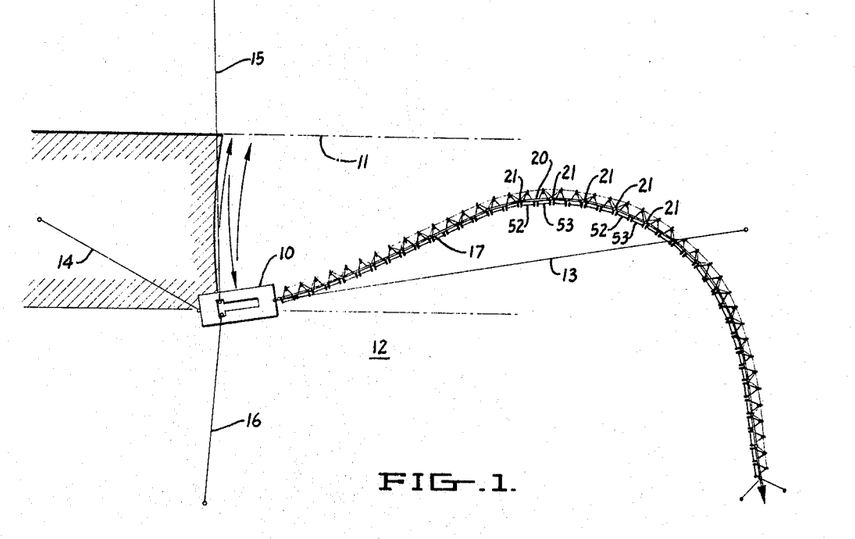
FIG. 1 is a plan view, schematically illustrating a hydraulic dredging barge of the type illustrated in Patent No. 2,933,937, having an pipeline extending therefrom suspended by the pontoon support of the present invention.

Referring now to the drawings in detail, in FIG. 1 there is shown a hydraulic dredging barge 10 of the type disclosed in the aforementioned patent in the process of cutting a channel 11 in the floor 12 of a body of water. The barge 10 is anchored to the floor 12 by bow and stern guidelines 13 and 14, respectively, and port and starboard swinglines 15 and 16, respectively. In operation, as is indicated by the arcuate arrow lines, the swinglines 15 and 16 function to move the barge and the hydraulic cutter carried thereby transversely back and forth to cut the channel 11. The detailed structure and operation of the barge 10 and the guide and swinglines cooperating therewith is developed in the aforementioned Patent No. 2,933,837.

The barge 10 has secured thereto and extending therefrom a discharge pipeline designated in its entirety by the numeral 17. The pipeline 17 is suspended above the surface of the body of water in which the barge 10 is working by the pontoon support structure to which the present invention is primarily directed. This structure, as will be developed subsequently, supports the pipeline for movement responsive to both swinging of the barge 10 and wind and wave action. Flexibility of the pipeline itself, which is comprised of relatively rigid sections 20, is provided by articulated ball joints 21 connecting the ends of these sections.

Pipeline truss structure

The details of the sections of pipeline 20, the ball joint 21 therebetween, and the structure maintaining the sections in relatively rigid condition will now be developed with respect to FIGS. 4, 5, 6 and 7. From these figures it can be seen that each of the sections 20 is maintained in rigid condition by a Warren truss 22 strapped therebelow. The truss comprises: an angle compression member 23 held to the section 20 by straps 24 extending therearound; a tubular tension member or pipe 25 spaced below the compression member 23, and, web members 26 rigidly interconnecting the members 23 and 24. It is to be understood that all of the members 23, 25 and 26 are of rigid construction.

Pipeline joint and interior structure

Figures 4, 5, 7:
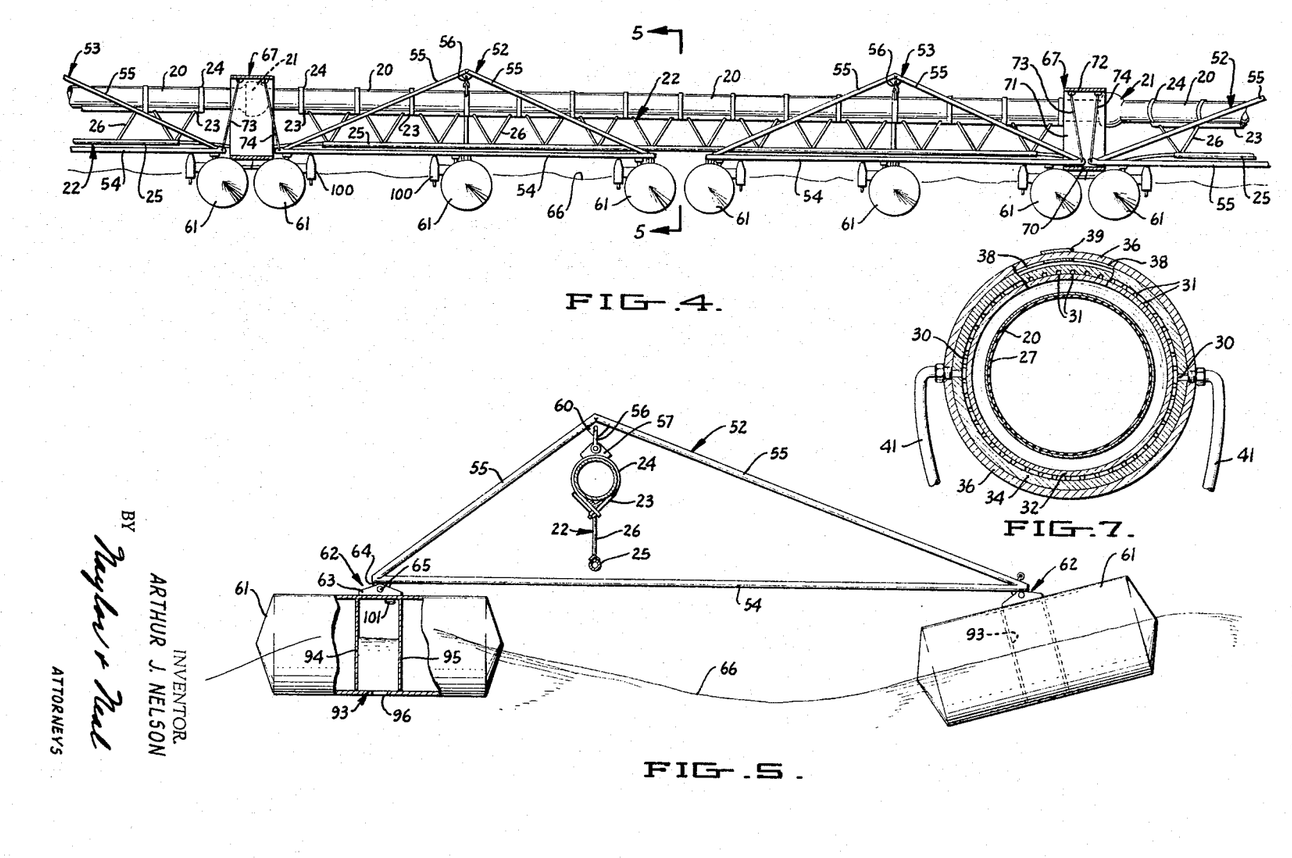
Figures 6, 8, 9:
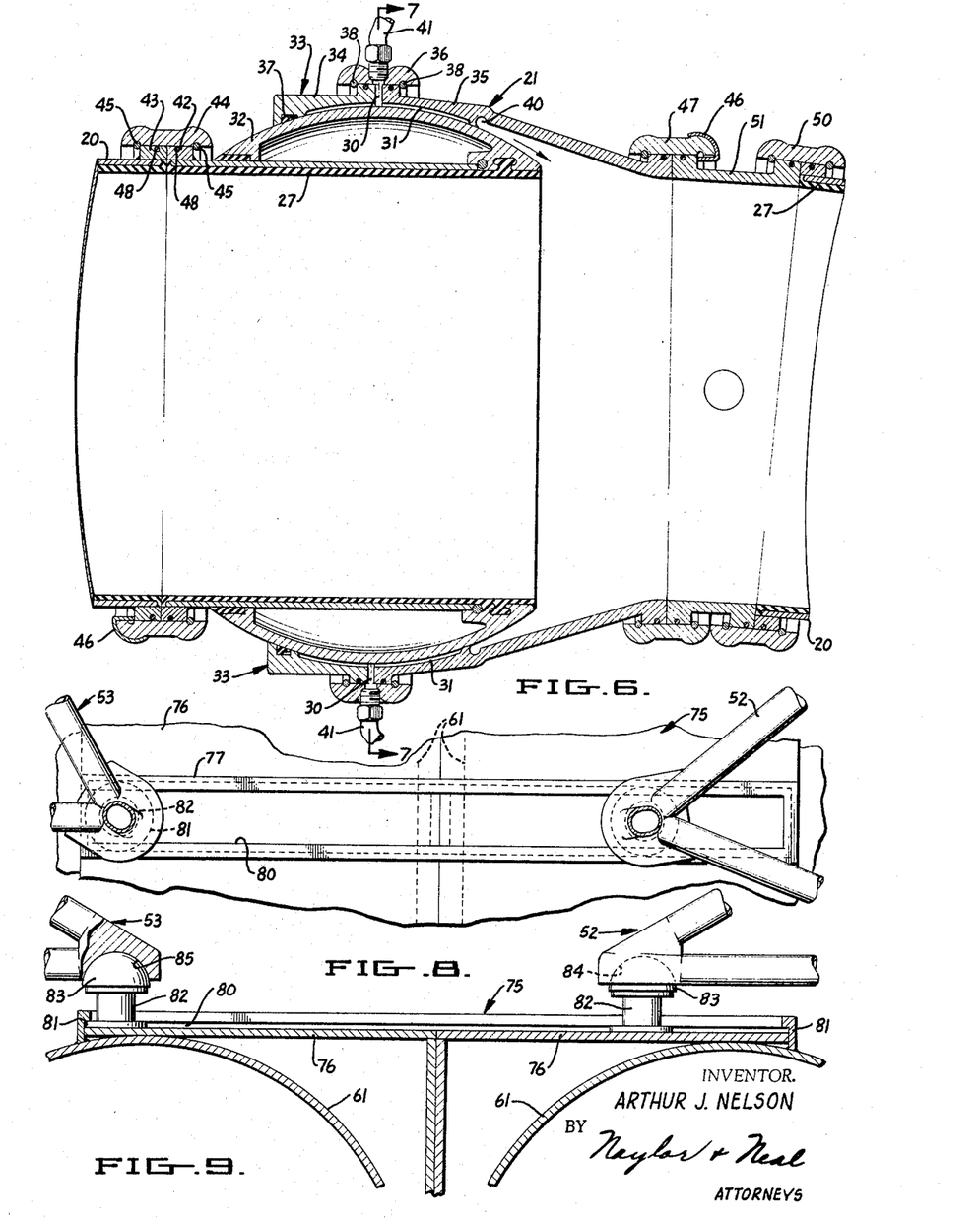
FIG. 6 is a sectional view in elevation showing one of the universal connections between the sections of pipeline suspended from the pontoon support of the invention.
FIGS. 8 and 9 are plan and elevational views, respectively, showing in partial section a construction alternative to that shown in FIG. 4 for connecting the frameworks of the pontoon support to the pontoons adjacent the universally connected ends of the sections of pipe.

The detailed construction of the pipeline sections 20 and ball joints 21 can best be seen from FIGS. 6 and 7. It is to be understood that this construction is designed for use in conveying abrasive fluids, such as those produced during hydraulic dredging operations as illustrated in FIG. 1. Where less abrasive fluids, such as crude petroleum, are conveyed through the pipeline, the abrasion preventing structure of the FIG. 6 illustration may be omitted. This structure comprises, in part, a rubber sheath 27 lining the sections 20 and a fluid flushing duct and grooves 30 and 31, respectively, at the joint 21. The remaining abrasion preventing structure will be developed subsequently.

Figure 2:
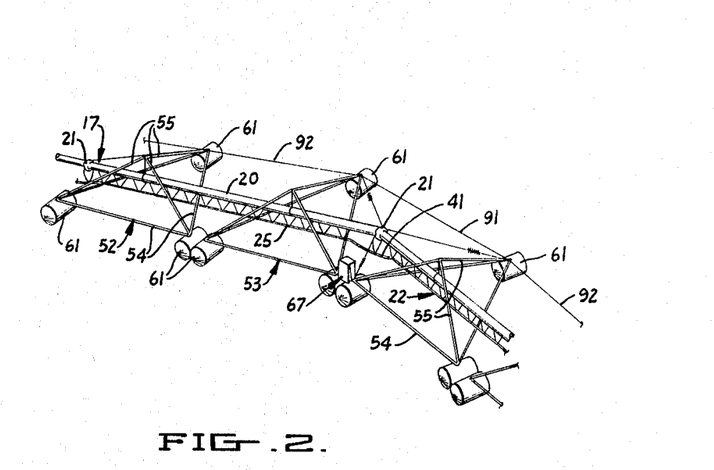
FIG. 2 is a perspective view, schematically illustrating a section of the pontoon support illustrated in FIG. 1.

The joint 21 is comprised of a ball section 32 and a socket element 33 slidably and sealingly received on the section 32. The socket element 33 is of high Brinell hardness to withstand abrasion and comprises an annular section 34 and a semispherical section 35 which are held together by a rigid annular strap 36 extending around juxtaposed collars thereon. Snap rings 38 having U-shaped clips 39 received between the spaced ends thereof are received in the strap 36 to hold the collars on the sections 34 and 35 in juxtaposed relationship. The details of the snap rings, clips, and seals cooperating with the sections 34 and 35 will become more apparent subsequently. The ducts 30 and grooves 31 are formed in the socket element 33 and are so arranged as to continuously supply flushing fluid to the mating surfaces of the ball section and socket element. Specifically, the grooves 31 open through the surface of the element 33 in juxtaposition to the section 32 and are provided with sealing and wiping elements 37 and 40 at their opposed ends. The sealing element 37 prevents the escape of fluid therepast from the grooves 31, while the wiping element 40 permits the limited flow of flushing fluid therepast and into the interior of the joint. The flow of fluid past the wiping element 40 is so limited that the fluid within the grooves 31 is maintained under pressure and, in effect, establishes a fluid cushion between the socket element 33 and ball section 32. At this point it is noted that the grooves 31 are separated from each other and extend longitudinally of the socket element 33. The duct 30 extends completely around the element 33 and communicates with each of said grooves. Flushing fluid is provided to the duct 30 through means of flexible hoses 41 secured thereto and extending into fluid communication with the pipe 25 of the Warren truss (see FIG. 2). The pipe 25 is continuously supplied with flushing fluid (i.e., water) under pressure by a pump (not illustrated) located on the barge 10.

Mating annular collars 42 and 43 on the ball section 32 and the pipeline section 21 adjacent thereto cooperate with an annular strap 44 extending therearound to hold said pipeline and ball section in locked engagement. This locked engagement is accomplished through means of annular snap rings 45, corresponding to the rings 38, held in the strap 44 in juxtaposition to the outside surfaces of the collars 42 and 43. In order to assure that the snap rings 45 will not inadvertently compress and release the sections 20 and 32, a U-shaped clip 46, corresponding to the clip 39, is snapped over the strap 44 and one leg thereof between the opposed ends of the snap ring. Naturally, the clip 46 is put in place after the snap rings 45 are engaged in the strap 44. O-rings 48 extend around the flanges 42 and 43 in juxtaposition to the strap 44 to establish a sealed connection between the flanges and the strap.

At this point it is noted that the strap 36 and the retention and sealing structure therein cooperates with the annular sections 34 and 35 in a manner corresponding to that described with reference to the relationship between the strap 44 and the sections 20 and 32. Furthermore, the socket element 33 is secured to the pipeline section 20 adjacent thereto through means of annular straps 47 and 50 corresponding in construction and operation with the strap 44. In the latter case, the straps 47 and 50 hold a wedge-shaped conduit section 51 between the element 33 and pipeline section 20. The section 51 is simply shown to illustrate how a preset curvature may be imparted to the pipeline formed of the sections 20 without bending of the ball joint. Imparting a preset curvature in this manner, rather than through bending of the ball joint, has the advantage that flow restriction resulting from bending of the ball joint is avoided.

Pontoon support structure

Referring now to the pontoon support system to which the present invention is primarily directed, this system basically comprises a plurality of subassemblies in the form of pontoon supported frameworks 52 and 53. In the preferred embodiment illustrated, each section of pipeline 20 is supported by one pair of frameworks 52 and 53 and the pairs of frameworks supporting the respective universally connected sections of pipeline are identical. Accordingly, for the sake of simplicity, only two of the frameworks will be described in detail. Furthermore, since the superstructures of the frameworks 52 and 53 are identical, only one will be described and like numerals will be used to designate elements which correspond identically on the respective superstructures.

Figure 3:
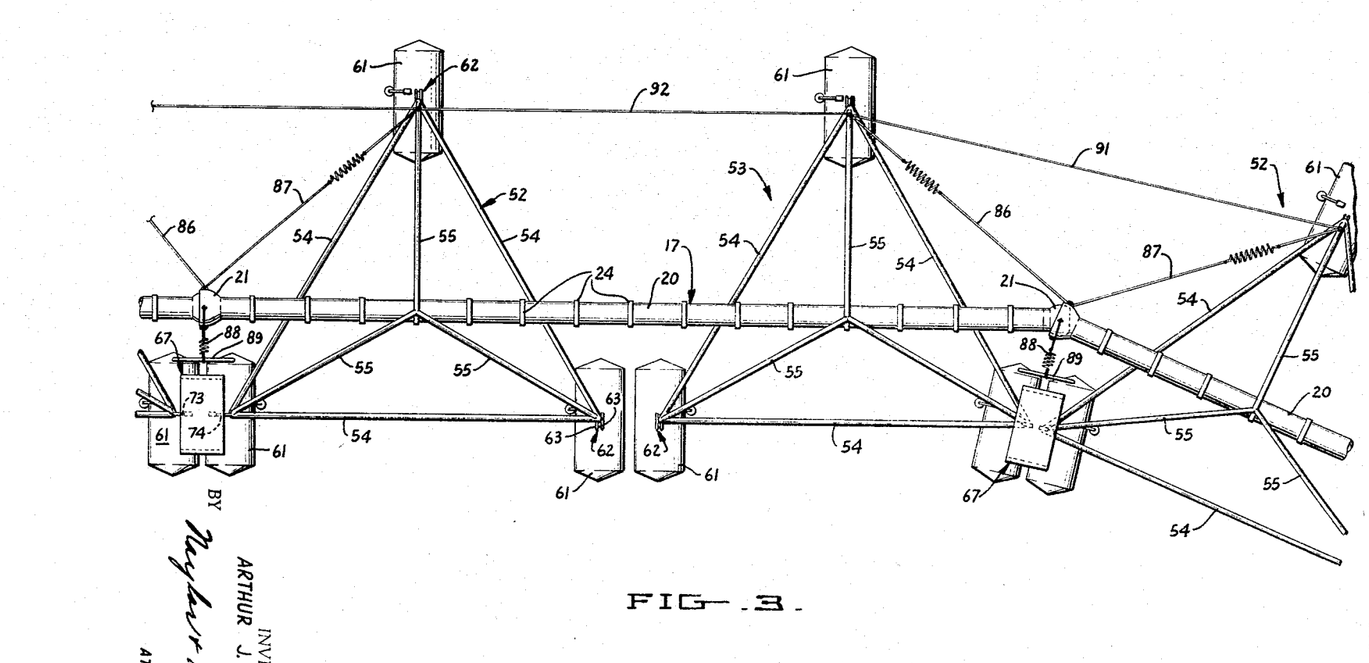
FIG. 3 is a detailed plan view of a section of the pontoon support illustrated in FIG. 1.

The superstructures of the frameworks 52 and 53 each comprise: a base portion formed of three pipes or tension members 54 of equal length fixedly secured together at their ends to define an equilateral triangle; and an upstanding portion formed of three pipes 55 of equal length, each of which is joined at one end to an end of the other and at the end to an apex of the triangle formed by the base portion. Thus, each of the frameworks 52 and 53 is comprised of a plurality of joined pipes so associated as to define a tetrahedron. Ideally, the pipes 54 and 55 are so proportioned relative to each other that the tetrahedron has a length approximately four times as great as its height. The length of the preferred embodiment of the framework, as illustrated in FIG. 3, is slightly less than one half the length of the pipeline section to be supported thereby.

Each of the frameworks 52 and 53 has suspended from the apex of the upstanding portion thereof a strap 56 adapted to be secured to a section of pipeline disposed therebelow by a saddle 57. In the preferred embodiment, the strap and saddle are so dimensioned as to suspend the section of pipeline supported thereby at a position wherein its centerline is located above the base portion of the framework by a distance equal to about two-thirds of the framework height. To provide for universal pendulous movement of a section of pipeline supported by the strap 56, the strap is secured at its upper end for pivotal movement about an axis normal to the pipeline and at its lower end about an axis aligned with the pipeline. In the preferred embodiment illustrated, this pivotal arrangement is provided by fabricating the strap 56 as a U-shaped chain shackle having its base portion extending through a slotted element 60 secured to the framework and its legs secured to a stud extending loosely through the saddle 57.

Each of the frameworks 52 and 53 is supported at the apexes of its base portion by pontoons 61. As viewed in the drawings (FIGS. 1, 2, 3 and 4), all of the pontoons to the port of the pipeline 17 and the fore pontoon on each of the frameworks 52 and aft pontoons on each of the frameworks 53 at the starboard side are mounted on the frameworks through identical structure. Accordingly, this structure will be identified in all instances by like numerals and as shown in FIG. 5 will be described in detail.

Referring now to FIG. 5, the supporting structure for the pontoon therein is designated in its entirety by the numeral 62. This structure comprises a pair of upstanding plates 63 (see FIGS. 3 and 9) fixed to the upper surface of the pontoon 61 and extending longitudinally thereof; an ear 64 fixed to the apex of the framework adjacent the pontoon and extending loosely between the plates 63; and, a pin 65 fixed to and extending between the plates 63 and loosely through an opening in the ear 64. Through this arrangement, the pontoons secured by the support structure 62 are free to pivot in a plane substantially normal to the axis of the pipeline 17. The advantage of this pivoting action is exemplified in FIG. 5 wherein the pontoons 61 are shown floating on the wavy surface of a body of water 66. From this illustration it can be seen that the free pivoting action of the pontoons independent of each other provides for the maintenance of the framework 52 in a generally upright position.

Structure 62 embodies a suggested method to fasten pontoon 61 to frameworks 52 and 53 as indicated. It is recognized various hinged connections are conceivable such as employment of a bearing point located within a well provided low in pontoon 61 below the position 62 assumes.

The pontoon support structures disposed fore of each of the frameworks 53 and aft of each of the frameworks 52, as viewed in the drawings, are all identical. Accordingly, like numerals will be used to identify all of these structures and the elements thereof. Referring now to the right-hand side of FIG. 4, the numeral 67 designates the pontoon support structure in its entirety. This structure comprises a base plate 70 fixed to and extending between the adjacent pontoons 61; a pedestal fixed to and extending upwardly from said base plate composed of side plates 71 and a top plate 72; and, suspension cables 73 and 74 extending between the top plate 72 and the apexes of the frameworks 53 and 52, respectively, therebelow. Through the cables 73 and 74, the support structure 67 functions to both secure the pontoons fixed thereto flexibly to the frameworks 52 and 53 and to secure these frameworks together for limited relative movement. Specifically, as is exemplified by the relative positions of the support structure 67 at the left and right hand sides of FIG. 4, the cables 73 and 74 provide for movement of the frameworks 52 and 53 toward and away from each other. In FIG. 4, the right-hand illustration of the structure 67 illustrates the position of the cables 73 and 74 when the pipeline 17 is bent to a minimum radius of curvature, whereas the left-hand illustration of the support 67 illustrates the position of the cables when the pipeline assumes a straight condition. The other factors of construction which limit the radius of curvature of the pipeline will be developed subsequently.

As seen in FIGS. 1 and 3, the pipeline curvature is directed to the starboard side, for which case the framework is prearranged to provide support structure 67 on the starboard side. When a requirement places line curvature to the port side, then the frameworks will be prearranged to provide 67 on the port side. Therefore, arrester wire 91, as will be developed subsequently, will always occur at a greater radius of curvature than that of the pipeline 20.

Referring now to FIGS. 8 and 9, therein is illustrated an alternative pontoon support structure 75 adapted to be used in place of the structure 67. The structure 75 comprises: a pair of plates 76 fixed to and extending between the adjacent pontoons 61; a track 77 having an inverted T-shaped slot 80 therein fixed to the plates 76 and extending transversely across the pontoons fixed thereto; stop elements 81 closing the ends of the tracks 80; a pair of inverted T-shaped follower elements 82 slidably received in the slot 80 and having at the upper ends thereof semispherical members 83; and, semispherical sockets 84 and 85 on the apexes of the frameworks 52 and 53, respectively, adjacent the pontoons 61 slidably received on the semispherical members 83. In operation, the structure 75 functions similarly to the structure 67 in that it provides for the flexible connection of the frameworks 52 and 53 to the adjacent pontoons 61 and at the same time connects these frameworks for limited movement toward and away from each other. Flexibility in this case is provided primarily by the articulated connections at the sockets 84 and 85 whereas movement of the frameworks toward and away from each other is provided by the slidable engagement of the follower elements 82 in the track 77.

The construction which together with the aforedescribed structure 67 and suspension structure for the pipeline sections 21, functions to maintain the frameworks 52 and 53 in alignment with the pipeline sections supported thereby and to limit the bending of the pipeline at the joints 21 is best illustrated in FIG. 3. This construction includes: spring wires 86 and 87 secured between the ball joint 21 and the base apexes of the frameworks 52 and 53 adjacent thereto on the port side of the pipeline; a spring wire 88 secured between the ball joint 21 and a rod 89 fixed to the pontoons held together by the structure 67; an arrester wire 91 of a fixed length secured between the apexes of the frameworks 52 and 53 to which the wires 86 and 87 are secured; and, an arrester wire 92 of a fixed length secured between the port base apexes of the frameworks 52 and 53 intermediate the ends of the pipeline section 20. The spring wires 86 and 87 are so tensioned as to resist misalignment of the frameworks adjacent the ball joint 21, while the spring wire 88 functions primarily to lead the pontoons secured thereto into a position aligned with the bisector of the angle formed by the joint 21. The wire 91 is a length which limits angular departure of pivotally connected pipeline sections to a predetermined extent. The arrester wire 92 is of such a length that, together with the sections of pipeline 20, it functions to prevent any substantial degree of misalignment between the frameworks to which it is secured.

In order to control the displacement of each of the pontoons 61 and thus selectively vary the degree to which they are affected by wave action (as seen in FIG. 5), each pontoon is provided at its midsection with a ballast tank 93 defined by a pair of spaced end walls 94 and 95 extending thereacross and the pontoon sidewall between these endwalls. The lower extremity of the ballast tank sidewall has extending therethrough an opening 96 which is adapted to communicate with the body of water in which the pontoon is placed and thus admit water from this body into the interior of the tank. The upper extremity of the ballast tank 93 has an opening extending therethrough in which the mounting nipple 101 of a valve body 97 is received. Through the valve body, as will be developed subsequently, compressed air may be selectively introduced into or exhausted from the tank 93 to vary the amount of water contained therein and, in turn, vary the buoyancy of the pontoon. Specifically, the admission of compressed air into the tank 97 functions to exhaust water therefrom through the opening 96, while the venting of compressed air from the tank permits water to enter thereinto through the opening 96.

Figure 10:
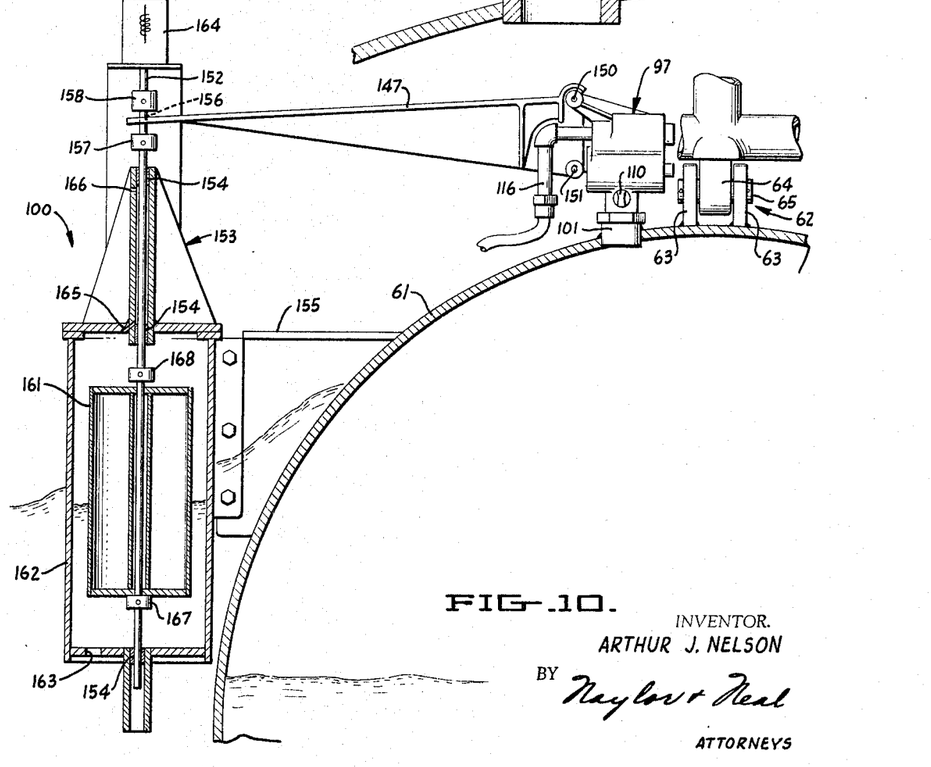
FIG. 10 is an elevational view, partially in section, illustrating the displacement controlled float and valve structure adapted to vary the buoyancy of the respective pontoons of the inventive support; and, FIG. 11 is an elevational view illustrating the valve structure of FIG. 10 in section.
Figure 11:
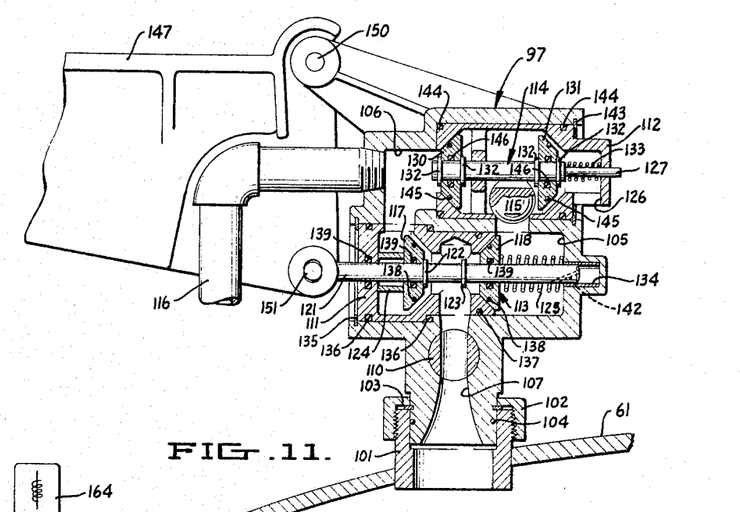

Referring now to FIGS. 10 and 11, therein is illustrated the arrangement for selectively admitting compressed air into the tank 61, including the valve structure in the body 97 and a float control 100 operable to actuate this structure responsive to the displacement of the pontoon 61. Since the valve and float control combination is identical for each of the pontoons 61, only one of these combinations will be described and like reference numerals will be applied to all combinations.

The valve body 97 is secured to the pontoon 61 through means of a nipple 101 fixed to and extending through the pontoon sidewall into the tank 93. A nut 102 held on the housing for rotational movement by a snap ring 103 is threadably received on the nipple 101 to secure the housing in place. To assure a sealed connection between the housing and nipple, an O-ring 104 is received in the housing nut 97 so as to sealingly engage the interior of the nipple 101. Fluid communication between the nipple 101 and chambers 105 and 106 formed in the body 97 is established by a passage 107 having a plug valve 110 therein. Normally, the plug valve is maintained in the open condition illustrated in FIG. 11.

The chambers 105 and 106 have received therein double-faced annular valve seat members 111 and 112, respectively. These valve seat members cooperate with double-acting valves 113 and 114 and a ball check valve 115 to control the flow of compressed air to and from the ballast tank 93 through the passage 107. Compressed air is supplied by a line 116 communicating with the chamber 106 and extending to a source of compressed air (not illustrated) on the barge 10. It is to be understood that a common line 116 is used to supply compressed air to all of the pontoons 61.

The valve 113 comprises a pair of closure discs 117 and 118 slidably received on a rod 121 on opposite sides of the valve seat member 111. Movement of the rod 121 is transmitted to the discs 117 and 118 by a pair of collars 122 and 123, which collars are fixed in spaced relationship on the rod 121 in an orientation which provides for lost motion of the rod without movement of the discs 117 and 118. A sleeve 124 limits the degree to which the disc 117 may be opened and a coil spring 125 normally urges the disc 118 to the closed condition illustrated. Movement of the rod 121 to the left, as viewed in FIG. 11, functions to force the disc 117 to the open condition and thus establishes air flow from the line 116 to the tank 93. This same movement permits the spring 125 to force the disc 118 to the closed condition illustrated. Movement of the rod 121 to the right, as viewed in FIG. 11, functions to first take up the provision for lost motion between the collar 123 and the disc 118 and then to force the disc 118 to the open position, thus establishing air vent from the tank 93 to chamber 106, the latter being through the check valve 115. It is noted that the section of the chamber 106 in communication with the check valve 115 is normally open to the atmosphere through an opening 126. When the rod 121 is forced to the condition opening the disc 118, the disc 117 is free to be either open or closed responsive to differential pressure established thereacross.

The valve 114 comprises a rod 127 axially slidable in the valve seat member 112 and having closure discs 130 and 131 fixed thereto by snap rings 132. A coil spring 133 is interposed between the rod 127 and the member 112 to normally urge the rod to a position closing the disc 130 and opening the disc 131. As will be developed from the subsequent discussion, differential pressure can be established across the discs 130 and 131 and the check valve 115 to close the check valve and the disc 131 and simultaneously open the disc 130.

The construction in the valve body 97 is completed by retention and sealing structure of a conventional nature. In the chamber 105, this structure comprises: sleeve bushing 134; snap ring 135; and O-rings 136–139. The structure in the chamber 105 also includes an air vent passage 142 extending between the end of the rod received in the bushing 134 and the portion of the chamber receiving the spring 125. The retention and sealing structure in the chamber 106 comprises: snap ring 143; and O-rings 144, 145 and 146.

The float control 100 is coupled to the valve body 97 by an arm 147 of generally triangular configuration having one corner fulcrumed about a pin 150 carried by the body 97, another corner pivotally secured to the rod 121 by a pin 151, and its remaining corner secured to a rod 152 for limited lost motion with respect thereto. The rod 152 is slidably received for axial movement in a housing 153 by bushings 154 and the housing is fixedly secured to the pontoon 61 by a bracket 155. The lost motion connection between the arm 147 and rod 152 is established by an opening 156 in the arm through which the rod passes and a pair of collars 157 and 158 adjustably secured to the rod on opposite sides of the arm.

The control 100 is completed by a float 161 secured to the lower end of the rod 152 for limited movement with respect thereto; a tank 162 enclosing the float 161 and fixed to the housing 153, said tank having an opening 163 therethrough; and, a solenoid 164 fixed to the upper end of the housing 153 in operative engagement with the rod 152. The tank 162 is so positioned relative to the pontoon 61 that the opening 163 is adapted to be in fluid communication with a body of water in which the pontoon is floating. Thus, the interior of the tank 163 has a level of water therein corresponding to the level of water in which the pontoon is located. The opening 163 is of limited area so that the level of water within the tank 162 will not vary erratically with wave and splash action around the pontoon, but rather will vary gradually as the displacement of the pontoon occurs. Vent openings 165 and 166 provide for the venting of air from the section of the tank 162 disposed above the water therein. The float 161 is secured to the rod 152 for limited axial movement with respect thereto by stop collars 167 and 168. These collars, together with the collars 157 and 158, may be adjusted to control lost motion in the float control and the displacement of the pontoon 61 which will swing the arm 147 and, in turn, actuate the structure of the valve body 97. Adjustment of this type can also be accomplished by moving the housing 153 relative to bracket 155.

During normal operation, the aforedescribed float and valve control structure is so adjusted as to maintain the pontoons 61 in a condition wherein they are approximately 90% submerged. To accomplish this, the control 100 is adjusted so that the float 161 is at the neutral position illustrated when the pontoon 61 is 90% submerged. When the displacement of the pontoon varies from this submersion, the valve body 97 functions to either exhaust water from or admit water to the tank 93 to re-establish the desired submergence. Specifically, when the displacement of the pontoon becomes excessive, the float 161 forces the arm 147 upwardly, thus pulling the valve rod 121 to a position opening the valve disc 117. In this condition, air is admitted into the ballast tank 93, thus exhausting water therefrom and increasing the buoyancy of the pontoon. When the pontoon reaches the desired displacement, the float 161 swings the arm 147 to a position wherein the rod 121 releases the disc 117 to the action of differential pressure. At this point, the differential pressure across the disc 117 functions to close it against the valve set member 112, thus stopping the flow of air into the ballast tank 93. When the pontoon 61 displaces less than the desired degree of water, the float 161 pulls the arm 147 downwardly to a position wherein the rod 121 forces the valve disc 118 to the open condition. In this condition the air in the ballast tank 93 is vented (via 126) to the atmosphere past both the ball check valve 115 and the valve disc 131. When the pontoon once again reaches the preselected displacement, the float 161 forces the arm to a position wherein the rod 121 again releases the disc 118. At this point, the spring 125 forces the disc 118 to the closed position, thus terminating venting.

As an alternative to the utilization of the above-described structure as a condition responsive control, it is possible to selectively operate the control so as to overcome its condition responsive characteristics. Specifically, if it is desired to increase the buoyancy of the pontoon 61 independent of its displacement, it is merely necessary to actuate the solenoid to lift the arm to a position opening the valve disc 117. It is noted that during this operation the rod 152 lifts the float 161 to a position simulating that which occurs when the pontoon 61 is excessively submerged, as was described above. After the buoyancy of the tank 61 is increased to the desired extent through utilization of the solenoid 164, the solenoid may be inactivated thus permitting the float 161 to drop. At this point, if it is desired to maintain the buoyancy of the pontoon irrespective of the position of the float 161, the pressure applied to the line 116 may be increased to an extent sufficient to operate all of the valves 113, 114 and 115 as differential pressure valves. Specifically, diffential pressure may be established to force the discs 117 and 131 to the closed condition. In this condition the flow of air both into and out of the ballast tank 93 is prevented. It is noted that the latter differential pressure control is not limited to utilization in combination with the solenoid control 164, but rather may be used at any desired time. In other words, the differential pressure control may be used to inactivate the condition responsive control at any time.

It is to be understood that the solenoid 164 is electrically operated as is well known in the art. The means to effect this operation may take the form of a power source and switch on the barge 10 and electrical leads extending to the solenoid. Typically the lead circuitry would be so arranged that the solenoids 164 on each of the pontoons 61 would be actuated simultaneously.

To conclude, from the foregoing description it is believed apparent that the present invention enables the accomplishment of the objects initially set forth herein. In particular, an improved pontoon assembly of great flexibility and controlled buoyancy has been provided to support pipelines under both fair and adverse weather conditions. The controlled buoyancy characteristics of the assembly are particularly desirable in that they provide both for minimum disturbance of the assembly during adverse weather conditions and for minimum resistance of the assembly during fair weather conditions and times when it is desired to transport the assembly. It is therefore, to be understood that the invention is not intended to be limited to the details of the specific embodiments illustrated and described, but rather as defined by the following claims.

What is claimed is:

1. An assembly for supporting sections of pipeline having universally connected ends above the surface of a body of water for limited articulated movement relative to each other about said ends, comprising:
   (a) a plurality of aligned frameworks disposed in parallel relationship to each of said sections, said frameworks each comprising:
      (1) a base portion;
      (2) three mounts disposed on said base portion in a substantially horizontal plane, said mounts being spaced relative to each other to define the apexes of a triangular configuration; and,
      (3) an upstanding portion fixed to and extending upwardly from said base portion;
   (b) means on the upstanding portion of each of said frameworks pendulously suspending the section of pipeline which is in parallel relationship therewith;
   (c) first pontoon means secured, respectively, to and extending downwardly from a pair of said mounts on each framework along a line extending substantially parallel to and to one side of the section of pipeline suspended therefrom for free pivotal movement relative to said framework about an axis substantially parallel to said section;
   (d) second pontoon means secured to and extending downwardly from the remaining mount on each framework on the other side of the section of pipeline suspended therefrom for free pivotal movement relative to said framework about an axis substantially parallel to said section; and wherein,
   (e) said first and second pontoon means are of sufficient buoyancy to support said framework and sections of pipeline suspended therefrom above the surface of the body of water; and,
   (f) the frameworks disposed on opposite sides of the universally connected ends of the sections of said pipeline are joined together for limited articulated movement with respect to each other.

2. An assembly according to claim 1, wherein:
   (a) said frameworks are each comprised of a plurality of axially extensive members fixedly secured together at the ends thereof to define the edges of a tetrahedron;
   (b) said base portion is defined by one side of said tetrahedron;
   (c) said upstanding portion is defined by the other three sides of said tetrahedron; and
   (d) said mounts are located at the apexes of the side defining said base portion.

3. An assembly according to claim 1, wherein:
   (a) said means pendulously suspending the sections of pipeline from the upstanding portion of each of said frameworks comprises a strap secured at one end to the top of said upstanding portion and at the other end to the section of pipeline suspended therefrom; and,
   (b) said means provides for universal pendulous movement of the section of pipeline suspended therefrom relative to the framework.

4. An assembly according to claim 3, wherein the frameworks disposed immediately adjacent and on opposite sides of the universally connected ends of the sections of pipeline are joined by structure comprising:
   (a) means fixedly securing the adjacent first pontoon means on said frameworks together;
   (b) means securing said frameworks to the latter pontoon means for limited movement toward and away from each other;
   (c) means securing the adjacent second pontoon means on said frameworks together for limited movement away from each other; and,
   (d) the universally connected sections of pipeline pendulously supported by said frameworks.

5. An assembly according to claim 4 wherein the frameworks which are joined together for limited articulated movement with respect to each other are resiliently secured to the universally connected ends of the sections of pipeline by lines extending between said ends and portions of said frameworks at said second pontoon means.

6. An assembly according to claim 1, including means to control the buoyancy of each of said first and second pontoon means responsive to the combined weight of the frameworks and pipeline supported thereby and thus maintain the displacement of said pontoon means at a predetermined constant.

7. An assembly according to claim 6, wherein said means to control buoyancy comprises, on each of said pontoon means;
   (a) a ballast tank having first and second openings through substantially the upper and lower extremities thereof, respectively, said second opening being adapted to assume fluid communication with a body of water in which the pontoon means is disposed;

(b) a conduit in fluid communication with a source of compressed air; and,
(c) a valve comprising:
(1) a housing having a first passage in sealed communication with said first opening, a second passage in sealed communication with said conduit, and a third passage in communication with the atmosphere;
(2) flow control means in said housing adapted to selectively open and close said second and third passages to said first passage; and,
(3) a float adapted to ride on the surface of a body of water in which said pontoon means is disposed, said float being operatively associated with said flow control means to selectively open and close said second and third passages responsive to the displacement of said pontoon means to maintain said displacement at said predetermined constant.

8. An assembly according to claim 7 including means to operate said flow control means independent of said float to selectively vary the displacement of said pontoon means from said predetermined constant.

9. A subassembly adapted to support a section of pipeline above the surface of a body of water, comprising:
(a) a framework comprised of:
(1) a base portion;
(2) three mounts disposed on said base portion in a substantially horizontal plane, said mounts being spaced relative to each other to define the apexes of a triangular configuration; and,
(3) an upstanding portion fixed to and extending upwardly from said base portion;
(b) means adapted to suspend a section of pipeline from said upstanding portion for universal pendulous movement with respect thereto; and
(c) individual pontoon means secured, respectively, to the mounts disposed on said base portion for free pivotal movement relative to each other and said framework about axes substantially parallel to a section of pipeline suspended from said upstanding portion, said means being of sufficient buoyancy to support said framework and a section of pipeline suspended from the upstanding portion thereof above the surface of a body of water in which said framework is disposed.

10. A subassembly according to claim 9, including means to control the buoyancy of each of said pontoon means responsive to the combined weight of the framework and the section of pipeline supported thereby and thus maintain the displacement of said pontoon means at a predetermined constant.

11. A subassembly according to claim 10, wherein said means to control buoyancy comprises, on each of said pontoon means:
(a) a ballast tank having first and second openings through substantially the upper and lower extremities thereof, respectively, said second opening being adapted to assume fluid communication with a body of water in which the pontoon means is disposed;
(b) a conduit in fluid communication with a source of compressed air; and,
(c) a valve comprising:
(1) a housing having a first passage in sealed communication with said first opening, a second passage in sealed communication with said conduit, and a third passage in communication with the atmosphere;
(2) flow control means in said housing adapted to selectively open and close said second and third passages to said first passage; and,
(3) a float adapted to ride on the surface of a body of water in which said pontoon means is disposed, said float being operatively associated with said flow control means to selectively open and close said second and third passages responsive to the displacement of said pontoon means to maintain said displacement at said predetermined constant.

12. A subassembly according to claim 11 including means to operate said flow control means independent of said float to selectively vary the displacement of said pontoon means from said predetermined constant.

13. A subassembly according to claim 9, wherein:
(a) the pontoon means on one of said mounts is adapted to be secured to a mount on the base of the framework of a similar adjacent subassembly in supporting relationship with respect thereto; and,
(b) the latter pontoon means is adapted to support the mounts of adjacent frameworks secured thereto for limited movement toward and away from each other.

14. In a combination comprising:
(a) a pontoon adapted to float in a body of water in an upright position;
(b) a ballast tank in said pontoon having first and second openings through substantially the upper and lower extremities thereof, respectively, said second opening being adapted to assume fluid communication with a body of water in which said pontoon is disposed;
(c) a conduit in fluid communication with a source of compressed air;
(d) an improved valve adapted to admit and release compressed air from said ballast tank to control the buoyancy of said pontoon, comprising:
(1) a housing having a first passage in sealed communication with said first opening, a second passage in sealed communication with said conduit, and a third passage in communication with the atmosphere;
(2) flow control means in said housing adapted to selectively open and close said second and third passage to said first passage; and,
(3) a float adapted to ride on the surface of a body of water in which said pontoon is disposed, said float being operatively associated with said flow control means to selctively open and close said second and third passages responsive to the displacement of said pontoon to maintain said displacement at a predetermined constant regardless of the amount of weight supported thereby, providing said weight is within the supporting capabilities of said pontoon.

15. A combination according to claim 14 including means to operate said flow control means independent of said float to selectively vary the displacement of said pontoon from said predetermined constant.

16. A combination according to claim 15 including an apertured chamber fixed to said pontoon and loosely receiving said float, said chamber being adapted to be open to a body of water in which said pontoon is disposed and to enclose said float and delay the responsiveness thereof to a predetermined extent to changes in the displacement of said pontoon.

17. An assembly according to claim 1, wherein:
(a) the first pontoon means on each framework are spaced laterally from the section of pipeline suspended therefrom by substantially equal distances; and,
(b) the second pontoon means on each framework are spaced laterally from the section of pipeline suspended therefrom by a distance substantially twice that which said first pontoon means are spaced laterally from said section.

(References on following page)

References Cited by the Examiner

UNITED STATES PATENTS

| | | | |
|---|---|---|---|
| 410,801 | 9/1889 | Miller | 37—72 |
| 975,999 | 11/1910 | Richards et al. | 37—72 |
| 1,065,658 | 6/1913 | Berry | 37—72 |
| 2,758,851 | 8/1956 | Heath | 285—261 |
| 2,864,630 | 12/1958 | Breitenstein | 285—261 |
| 2,889,795 | 6/1959 | Parks | 114—125 X |
| 2,962,996 | 12/1960 | Smith | 114—.5 |
| 3,010,418 | 11/1961 | Wallace | 114—.5 |
| 3,060,463 | 10/1962 | Pentzien | 9—1 |
| 3,128,737 | 4/1964 | Usab | 114—.5 |

MILTON BUCHLER, *Primary Examiner.*

T. M. BLIX, *Assistant Examiner.*